United States Patent Office 3,290,289
Patented Dec. 6, 1966

3,290,289
PREPARATION OF 3,3-DISUBSTITUTED DIAZIRI-
DINES AND CERTAIN PRODUCTS THEREOF
Julius J. Fuchs, Wilmington, Del., assignor to E. I. du
Pont de Nemours and Company, Wilmington, Del., a
corporation of Delaware
No Drawing. Filed Dec. 14, 1964, Ser. No. 418,268
9 Claims. (Cl. 260—239)

This invention relates to cyclic, azino compounds and more particularly, this invention relates to diaziridine compounds of the following formula and to their preparation (1) 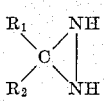

wherein $R_1$ is alkyl of 1 through 16 carbon atoms or phenyl;
$R_2$ is hydrogen or

wherein $R_3$ is hydrogen, or alkyl of 1 through 15 carbon atoms; and
$R_4$ is hydrogen or methyl;

provided that $R_1$ and $R_2$ can be taken together and are of the following formulae:

(2) 

wherein $n$ is a positive integer more than 1 and less than 15;

(3) 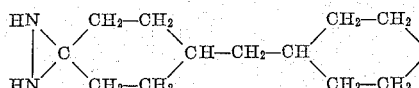

(4) 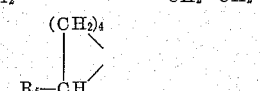

(5) 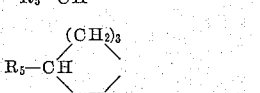

(6) 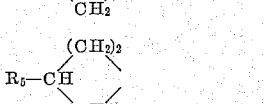

wherein $R_5$ is alkyl of 1 through 4 carbon atoms, alkoxy of 1 through 4 carbon atoms, or hydroxy;

with the limitation that there be no more than a total of 18 carbon atoms in the diaziridine.

Such compounds as dimethyldiaziridine, ethyldiaziridine and di-n-propyldiaziridine have been prepared in the past as the first step of a two-step process wherein the diaziridine is prepared and isolated and then is dehydrogenated to the corresponding diazirine. See, for example, Cyclic Diazo Compounds, Chem. Ber. 94, pp. 2166–2173 (1961) by Ernest Schmitz and Roland Ohme and 3,3-Dialkyl-diazocyclopropene-(1), Angewandte Chemie 72, 781–2 (1960) by S. R. Paulsen. However, such a process is slow and expensive and occasionally dangerous.

I have discovered a simple economic process for the preparation of the diaziridines of Formula 1 which involves reacting the corresponding N-chloroketimine compound with ammonia at a temperature of from about −25° C. to about 100° C. in the presence of an organic solvent.

The diaziridines prepared by my process can be used for the synthesis of hydrazine, or as starting materials for the preparation of diazirines which can be used as chemical blowing agents for such compounds as caprolactam, polyvinyl chloride, polyethylene, polypropylene, polyurethane, polystyrene, polychloroprene and other such polymers.

My process is carried out in the presence of an organic solvent. The solvents suitable for use in my process are those which will enhance the solubility of ammonia in the reaction system. For example, such solvents as methanol, ethanol, isopropanol, cyclohexanol, butanol, octanol, pentanol and heptanol can be used to advantage.

The amount of solvent used can range from about 50% based on the weight of the N-chloroketimine up to many times the amount of other reactants. Generally an amount of from about 300% to 1000% based on the weight of N-chloroketimine compound used, seems to be most beneficial to reaction rates.

Since one of the primary reasons for using a solvent is to promote ammonia solubility, the amount of solvent used is somewhat diminished if the reaction is carried out under pressure. This is due to the increased solubility of ammonia resulting from the increased pressure as will be obvious to those skilled in the art.

The amount of pressure exerted on the reaction can range from atmospheric up to the limits of the process equipment used. As a practical matter, from 1 to about 10 atmospheres pressure is preferred.

The reaction can be conducted at temperatures ranging from about −25° C. to about 100° C. For practical reasons a maximum temperature of about 70° C. is preferred. A minimum temperature of about 5° to 10° C. is also preferred as the amount of cooling equipment required increases rapidly with lower temperatures.

The ratio of reactants is not critical and generally speaking stoichiometric amounts are satisfactory. Therefore, 2 moles of ammonia per mole of N-chloroketimine is generally a satisfactory ratio. However, as the reaction is more efficient in the presence of an excess of ammonia, such an excess is normally maintained. The ratio of ammonia to N-chloroketimine has no upper limit as regards the ability of the reaction to progress, but as a practical matter no advantage is obtained by having a ratio greater than 40 moles of ammonia per mole of N-chloroketimine. For reasons of efficiency and economy the most preferred ratio of N-chloroketimine is between 4 to 1 and 20 to 1.

The N-chloroketimine compounds suitable for use in this process, as mentioned previously, will correspond to the diaziridine sought to be prepared. The formula for the N-chloroketimine compounds will therefore be

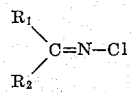

with $R_1$ and $R_2$ representing the same groups as in Formula 1.

These compounds can be obtained from commercial sources or they can be prepared by processes well known in the art, such as by dehydrochlorinating an N-chlorinated amine as disclosed in Reid U.S. Patent No. 3,137,728, issued June 16, 1964. Optionally the process can begin with the corresponding N,N-dichlorinated amine and go directly to the diaziridine without separating or isolating the intermediate N-chloroketimine.

Such an optional procedure would involve reacting the dichloroamine with ammonia under similar conditions to those used in the previously described process.

The operating temperatures and pressures as well as choice of solvents would be the same for the optional procedure as those disclosed for the previously described process.

The ratio of ammonia to dichloroamine would also be similar. The stoichiometric requirement is 3 moles of ammonia per mole of dichloroamine and similar excesses to those disclosed previously would be preferred for this reaction. The preparation of a diaziridine by reaction of the dichloroamine with ammonia will be further illustrated in the exampes.

Although the process as disclosed has dealt with compounds which have indicated unsubstituted alkyl side chains in the $R_1$, $R_2$, $R_3$ and $R_4$ positions, it should be understood that substituted side chains can also be present on these compounds and the resulting diaziridines. For example, such substituents as cyano, alkoxy, halogens, ethers, hydroxyls, carboxyls, phenoxy, nitro, sulfones, sulfoxides, phenyl, cycloalkyl, dialkylamines, thioethers and other such substituents can be present on the alkyl groups without departing from the concept of this invention. Of these substituents, the hydroxy, cyano and alkoxy are preferred, and it has been found most preferable to have them substituted on the $R_3$ position alkyl group.

The reaction vessel used will be determined by the temperature and pressure to be employed in the reaction. No other limitations exist as to the reactor except that it be equipped with means for introducing the reactants, be constructed of a material which is nonreactive with the reactants, and be equipped with means for agitating the contents. A high speed rotary type of mixer or any equivalent which will give sufficient agitation to obtain intimate gas-liquid contact is satisfactroy.

The reaction can be run either batchwise or continuously. At the conclusion of the reaction, or if running continuously when the product stream is drawn off, the diaziridine can be separated by conventional means such as by crystallization or distillation. If the solvent used has a higher boiling point than the diaziridine that is formed, the diaziridine can be removed by a lower distillation cut and the remainder of the batch or stream can be recycled to the reactor.

The diaziridines prepared by this process can be characterized by any of the methods well known in the art. For example, they may be characterized by liberation of iodine from acidified potassium iodide solutions, or by conversion to the corresponding diazirines by dehydrogenation, or by conversion to hydrazine and the corresponding carbonyl compound by hydrolysis. Other well known means of characterization are boiling points, melting points, and refractive indices.

Particularly preferred products of this invention are the diaziridines of Formula 1 wherein $R_1$ is alkyl of 4 through 16 carbon atoms, and
$R_2$ is hydrogen or

wherein $R_3$ is hydrogen or alkyl of 1 through 15 carbon atoms; and
$R_4$ is hydrogen or methyl;

provided that $R_1$ and $R_2$ can be taken together and are of Formulae 3, 4, 5 or 6 wherein $R_5$ is alkyl of 1 through 4 carbon atoms or alkoxy of 1 through 4 carbon atoms;

with the limitation that there be no more than a total of 18 carbon atoms in the diaziridine.

These diaziridines are particularly preferred because their dehydrogenation to the corresponding diazirines gives products which have superior properties as chemical blowing agents.

The most preferred diaziridines of this invention are 3-methyl-3-hexyl-diaziridine, 3'3' - methylene - bis - (3,3-pentamethylene-diaziridine, 3,3-pentamethylenediaziridine, and 3'-methoxy - 3,3 - pentamethylene-diaziridine because the corresponding diazirines prepared by dehydrogenation have high boiling points, and a behavioral thermal response which makes them especially useful as chemical blowing agents for certain types of polymers.

The following examples are given to more fully illustrate the invention and the percentages therein are by weight unless otherwise noted.

*Example 1*

One hundred and thirty-two parts of cyclohexyl-N-chloroketimine are dissolved in 320 parts of methanol and the solution saturated with ammonia gas as at 0° C. The pressure vessel is then closed and the reaction mixture allowed to come to room temperature. After standing overnight, vacuum is applied and the ammonia and methanol evaporated. The pot residue is stirred with dichloromethane, the ammonium chloride filtered off, and the filtrate concentrated to give 95 parts of crude 3,3-pentamethylenediaziridine which melts, after recrystallization from cyclohexane, at 104–105° C.

*Example 2*

One hundred and sixty-two parts of 2-octyl-N-chloroketimine are dissolved in 470 parts of isopropanol and the solution saturated with ammonia gas at −10° C. The pressure vessel is then closed and heated for 5 hours at 50° C. After removal of the excess ammonia by application of vacuum, filtration, and distillation of the isopropanol, the resulting 3-methyl-3-hexyl-diaziridine can be purified by conventional means, such as distillation under reduced pressure. However, for the purpose of preparing the corresponding diazirine the soution of the diaziridine in isopropanol is treated at 0–10° C. with 70 parts chlorine gas and 160 parts of 50% sodium hydroxide solution. From the resulting reaction product the 3-methyl-3-hexyl-diazirine is isolated by distillation. It has a boiling point of 44° C./10 mm.

*Example 3*

Ninety-nine parts of cyclohexylamine in 1500 parts of water containing 190 parts of sodium bicarbonate are chlorinated at 0–5° C. with 150 parts chlorine. The resulting oily phase (166.1 parts) of cyclohexyldichloroamine is separated and added slowly at 0–10° C. to 320 parts of methanol previously saturated with ammonia at 0° C. The reaction mixture is stirred at 0–10° C. until the yellow color of the dichloroamine has disappeared. The reaction mixture is then saturated with ammonia at 0° C., transferred to a pressure vessel and allowed to come to 25° C., where it is maintained overnight. Ammonia and methanol are removed by distillation under reduced pressure. The pot residue is extracted with 300 ml. of boiling dichloromethane. After filtration, the dichloromethane is evaporated under reduced pressure to give 96 parts of crude 3,3-pentamethylenediaziridine. The 3,3-pentamethylenediaziridine, after recrystallization from cyclohexane, melts at 104–105° C.

*Example 4*

Two hundred and forty-seven and five tenths parts of cyclohexylamine in 1800 parts of methanol at −10 to 0° C. are reacted with 380 parts of chlorine in preparation of the cyclohexyldichloroamine. During the chlorination the pH of the solution is maintained at 7–9 by the simultaneous addition of 425 parts of 50% sodium hydroxide solution. After the chlorination, an additional 193 parts of 50% sodium hydroxide solution is added at 0–10° C. and the reaction mixture maintained at 10° C. for 1 hour. After cooling to 0–5° C., 400 parts of gaseous ammonia are dissolved in the reaction mixture to react with the cyclohexyl-N-chloroketimine which is then allowed to come to room temperature and remain there overnight. After the addition of 240 parts of 50% sodium hydroxide and 500 parts water, vacuum is applied and the excess $NH_3$ and methanol distilled below 60° C. pot temperature. The pot residue is then extracted with dichloromethane to give crude 3,3'-pentamethylene-diaziridine in good yield.

*Examples 5–16*

By substituting molecularly equivalent amounts of the following N-chloroketimines for the cyclohexyl-N-chloroketimine in Example 1, the corresponding diaziridine product is obtained in yields similar to that of the 3,3-pentamethylene-diaziridine of Example 1.

| Ex. | N-chloroketimine | Diaziridine Product |
|---|---|---|
| 5 | 2-methylcyclohexyl-N-chloroketimine. | 1'-methyl-3,3-pentamethylene-diaziridine. |
| 6 | 3-methylcyclohexyl-N-chloroketimine. | 2'-methyl-3,3-pentamethylene-diaziridine. |
| 7 | 4-methylcyclohexyl-N-chloroketimine. | 3'-methyl-3,3-pentamethylene-diaziridine. |
| 8 | 2-methoxycyclohexyl-N-chloroketimine. | 1'-methoxy-3,3-pentamethylene-diaziridine. |
| 9 | 3-methoxycyclohexyl-N-chloroketimine. | 2'-methoxy-3,3-pentamethylene-diaziridine. |
| 10 | 4-methoxycyclohexyl-N-chloroketimine. | 3'-methoxy-3,3-pentamethylene-diaziridine. |
| 11 | 2-hydroxycyclohexyl-N-chloroketimine. | 1'-hydroxy-3,3-pentamethylene-diaziridine. |
| 12 | 3-hydroxycyclohexyl-N-chloroketimine. | 2'-hydroxy-3,3-pentamethylene-diaziridine. |
| 13 | 4-hydroxycyclohexyl-N-chloroketimine. | 3'-hydroxy-3,3-pentamethylene-diaziridine. |
| 14 | Methylene-bis-4-chloriminocyclohexane. | 3',3'-methylene-bis-(3,3-pentamethylene-diaziridine). |
| 15 | Cyclooctyl-N-chloroketimine. | 3,3-heptamethylenediaziridine. |
| 16 | Cyclododecyl-N-chloroketimine. | 3,3-undecamethylene-diaziridine. |

*Examples 17–26*

By substituting molecularly equivalent amounts of the following N-chloroketimines for the 2-octyl-N-chloroketimine in Example 2, the corresponding diaziridine product is obtained in yields similar to that of the 3-methyl-3-hexyl-diaziridine of Example 2.

| Ex. | N-chloroketimine | Diaziridine Product |
|---|---|---|
| 17 | Isopropyl-N-chloroketimine | 3,3-dimethyl-diaziridine. |
| 18 | 2-butyl-N-chloroketimine | 3-methyl-3-ethyl-diaziridine. |
| 19 | 2-pentyl-N-chloroketimine | 3-methyl-3-propyl-diaziridine. |
| 20 | 3-pentyl-N-chloroketimine | 3,3-diethyl-diaziridine. |
| 21 | 2-hexyl-N-chloroketimine | 3-methyl-3-butyl-diaziridine. |
| 22 | 3-hexyl-N-chloroketimine | 3-ethyl-3-propyl-diaziridine. |
| 23 | 2-heptyl-N-chloroketimine | 3-methyl-3-pentyl-diaziridine. |
| 24 | 3-heptyl-N-chloroketimine | 3-ethyl-3-butyl-diaziridine. |
| 25 | 3-octyl-N-chloroketimine | 3-ethyl-3-pentyl-diaziridine. |
| 26 | 2-undecyl-N-chloroketimine | 3-methyl-3-nonyl-diaziridine. |

I claim:

1. A process for the preparation of diaziridines of the following formula:

(1)
$$\begin{array}{c} R_1 \quad NH \\ \diagdown C \diagup | \\ \diagup \quad \diagdown | \\ R_2 \quad NH \end{array}$$

wherein $R_1$ is phenyl, alkyl of 1 to 16 carbon atoms or alkyl of 1 to 16 carbon atoms substituted with a substituent selected from the group consisting of cyano, hydroxy, and lower alkoxy;

$R_2$ is selected from the group consisting of hydrogen and $$-\underset{R_4}{\overset{|}{C}}H-R_3$$

wherein $R_3$ is hydrogen, alkyl of from 1 to 15 carbon atoms or alkyl of 1 to 15 carbon atoms substituted with a substituent selected from the group consisting of cyano, hydroxy and lower alkoxy;

$R_4$ is hydrogen, methyl, cyanomethyl, hydroxymethyl or lower alkoxymethyl;

provided that $R_1$ and $R_2$ can be taken together and are of the following formulae:

(2)
$$(CH_2)_n$$

wherein $n$ is a positive integer more than 1 and less than 15;

(3)
$$\begin{array}{cc} HN \diagdown \quad CH_2-CH_2 & CH_2-CH_2 \diagdown \\ \phantom{HN}C \diagup \quad \diagdown CH-CH_2-CH \diagup \quad \diagdown \\ HN \diagup \quad CH_2-CH_2 & CH_2-CH_2 \diagup \end{array}$$

(4)
$$\begin{array}{c} (CH_2)_4 \\ \diagdown \\ R_5-CH \diagup \end{array}$$

(5)
$$\begin{array}{c} (CH_2)_3 \\ R_5-CH \diagdown \\ \diagdown CH_2 \diagup \end{array}$$

(6)
$$\begin{array}{c} (CH_2)_2 \\ R_5-C \diagdown \\ \diagdown (CH_2)_2 \diagup \end{array}$$

wherein $R_5$ is selected from the group consisting of alkyl of 1 to 4 carbon atoms, hydroxy, and alkoxy of 1 to 4 carbon atoms, with the limitation that there will be no more than a total of 18 carbon atoms in the diaziridine; said process comprising reacting a compound selected from the group consisting of the corresponding N-chloroketimine and N,N-dichloroamine with ammonia at a temperature of from about −25° C. to about 100° C. and recovering the diaziridine compound thus formed.

2. A process for the preparation of diaziridines of the following formula:

(1)
$$\begin{array}{c} R_1 \quad NH \\ \diagdown C \diagup | \\ \diagup \quad \diagdown | \\ R_2 \quad NH \end{array}$$

wherein $R_1$ is phenyl, alkyl of 1 to 16 carbon atoms or alkyl of 1 to 16 carbon atoms substituted with a substituent selected from the group consisting of cyano, hydroxy, and lower alkoxy;

$R_2$ is selected from the group consisting of hydrogen and $$-\underset{R_4}{\overset{|}{C}}H-R_3$$

wherein $R_3$ is hydrogen, alkyl of from 1 to 15 carbon atoms or alkyl of 1 to 15 carbon atoms substituted with a substituent selected from the group consisting of cyano, hydroxy and lower alkoxy;

$R_4$ is hydrogen, methyl, cyanomethyl, hydroxymethyl or lower alkoxymethyl;

provided that $R_1$ and $R_2$ can be taken together and are of the following formulae:

(2)
$$(CH_2)_n$$

wherein $n$ is a positive integer more than 1 and less than 15;

(3)
$$\begin{array}{cc} HN \diagdown \quad CH_2-CH_2 & CH_2-CH_2 \diagdown \\ \phantom{HN}C \diagup \quad \diagdown CH-CH_2-CH \diagup \quad \diagdown \\ HN \diagup \quad CH_2-CH_2 & CH_2-CH_2 \diagup \end{array}$$

(4)  (5)  (6)

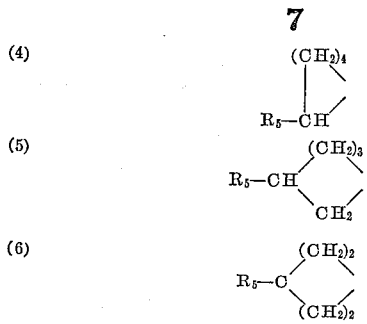

wherein
R₅ is selected from the group consisting of alkyl of 1 to 4 carbon atoms, hydroxy, and alkoxy of 1 to 4 carbon atoms,
with the limitation that there will be no more than a total of 18 carbon atoms in the diaziridine; said process comprising reacting the corresponding N-chloroketimine with ammonia at a temperature of from about −25° C. to about 100° C. and recovering the diaziridine compound thus formed.

3. 3',3' - methylene - bis-(3,3-pentamethylene-diaziridine).
4. 3'-methoxy-3,3-pentamethylene-diaziridine.
5. The process of claim 1 in which the starting material is cyclohexyldichloroamine.
6. The process of claim 2 in which the N-chloroketimine is cyclohexyl-N-chloroketimine.
7. The process of claim 2 in which the N-chloroketimine is 2-octyl-N-chloroketimine.
8. The process of claim 2 in which the N-chloroketimine is methylene-bis-4-chloriminocyclohexane.
9. The process of claim 2 in which the N-chloroketimine is 4-methoxycyclohexyl-N-chloroketimine.

References Cited by the Examiner
FOREIGN PATENTS
893,388   4/1962   Great Britain.

ALEX MAZEL, *Primary Examiner.*
HENRY R. JILES, *Examiner.*
ALTON D. ROLLINS, *Assistant Examiner.*